(12) United States Patent
Krieft et al.

(10) Patent No.: US 12,361,666 B2
(45) Date of Patent: Jul. 15, 2025

(54) APPARATUS FOR IDENTIFYING A WEATHER CONDITION IN THE AREA IN FRONT OF A VEHICLE

(71) Applicant: HELLA GmbH & Co. KGaA, Lippstadt (DE)

(72) Inventors: Florian Krieft, Lippstadt (DE); Claas Tebruegge, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 332 days.

(21) Appl. No.: 17/982,034

(22) Filed: Nov. 7, 2022

(65) Prior Publication Data

US 2023/0054646 A1   Feb. 23, 2023

Related U.S. Application Data

(63) Continuation of application No. PCT/EP2021/061703, filed on May 4, 2021.

(30) Foreign Application Priority Data

May 8, 2020   (DE) ..................... 10 2020 112 488.0

(51) Int. Cl.
    *G06V 10/141*   (2022.01)
    *B60W 40/02*    (2006.01)
    *G06V 10/145*   (2022.01)

(52) U.S. Cl.
    CPC .......... *G06V 10/145* (2022.01); *B60W 40/02* (2013.01); *G06V 10/141* (2022.01); *B60W 2420/403* (2013.01); *B60W 2555/20* (2020.02)

(58) Field of Classification Search
    None
    See application file for complete search history.

(56) References Cited

U.S. PATENT DOCUMENTS

| 9,946,937 B2 | 4/2018 | Faber et al. |
| 2014/0233805 A1* | 8/2014 | Faber ...................... G01W 1/00 |
| | | 382/104 |
| 2021/0403015 A1* | 12/2021 | Kato ...................... B60W 40/02 |

FOREIGN PATENT DOCUMENTS

| DE | 102010039092 A1 | 3/2011 |
| DE | 102012209810 A1 | 12/2012 |

(Continued)

OTHER PUBLICATIONS

International Search Report dated Sep. 8, 2021 in corresponding application PCT/EP2021/061703.

*Primary Examiner* — Idowu O Osifade
(74) *Attorney, Agent, or Firm* — Muncy, Geissler, Olds & Lowe, P.C.

(57) ABSTRACT

An apparatus for identifying a weather condition in surroundings of a vehicle, which includes an illuminating unit for illuminating the surroundings, a control unit for controlling the illuminating unit, an image capturing unit for capturing image information of the surroundings, an evaluation unit for evaluating the image information, image data provided by the image capturing unit being compared with predefined reference image data, each characterizing different weather conditions, and a weather condition signal being generated, depending on a match of the comparison, the control unit including a pulse modulation device, with the aid of which the illuminating unit is controlled in such a way that the illuminating unit emits pulsed light signals.

11 Claims, 3 Drawing Sheets

(56) References Cited

FOREIGN PATENT DOCUMENTS

DE  102017121119 A1  3/2019
EP       2983955 B1  6/2019

* cited by examiner

APPARATUS FOR IDENTIFYING A WEATHER CONDITION IN THE AREA IN FRONT OF A VEHICLE

This nonprovisional application is a continuation of International Application No. PCT/EP2021/061703, which was filed on May 4, 2021, and which claims priority to German Patent Application No. 10 2020 112 488.0, which was filed in Germany on May 8, 2020, and which are both herein incorporated by reference.

BACKGROUND OF THE INVENTION

Field of the Invention

The present invention relates to an apparatus for identifying a weather condition in surroundings of a vehicle includes an illuminating unit for illuminating the surroundings, a control unit for controlling the illuminating unit, an image capturing unit for capturing image information of the surroundings, an evaluation unit for evaluating the image information, image data provided by the image capturing unit being compared with predefined reference image data, each characterizing different weather conditions, and a weather condition signal being generated depending on a match of the comparison.

Description of the Background Art

An apparatus is known from DE 10 2012 209 810 A1, which corresponds to US 2014/0233805 for identifying a weather condition in surroundings of a vehicle, which includes an illuminating unit for illuminating the surroundings, a control unit for controlling the illuminating unit, an image capturing unit for capturing image information of the surroundings, as well as an evaluation unit for evaluating the image information. The evaluation unit compares the captured image information with predefined reference image information, which represents different weather conditions. If a match is established, a certain weather condition may be inferred. Depending on the comparison, different weather conditions may be identified, for example the presence of fog, rain, snow, and the like. The disadvantage of the known apparatus is that the evaluation may take place only if the illuminating unit is in the activated state, i.e., in particular while driving at night.

SUMMARY OF THE INVENTION

It is therefore an object of the present invention to provide an apparatus for identifying a weather condition in surroundings of a vehicle in such a way that a reliable capture of the instantaneous weather condition/weather situation, the road condition, and a visual range is always ensured in surroundings or an area in front of a vehicle.

To achieve this object, the invention is characterized in that the control unit includes a pulse modulation device, with the aid of which the illuminating unit is controlled in such a way that the illuminating unit emits pulsed light signals.

A particular advantage of the invention is that a weather condition in surroundings of the vehicle may be identified independently of an activated state of a light function. The basic idea of the invention is to operate an illuminating unit of the vehicle provided for a light function in a pulsed manner, so that it also emits light signals in a state of the illuminating unit, in which it does not generate a light function, for example a low-beam light function or the like.

Due to a pulsed emission of light signals, which preferably takes place at a frequency which is imperceptible to a human eye, a "scanning" of the vehicle surroundings or the area in front of the vehicle takes place, so that the instantaneous weather condition in the vehicle surroundings or the area in front of the vehicle may be inferred by comparing the received image data with predefined reference image data. A reliable identification of the instantaneous weather situation may thus take place at any time without interruption if the vehicle is in a driving and/or switched-on state. The invention may be advantageously used in automated vehicles or for autonomous driving (Level 5 vehicles), it being possible to automatically activate one or multiple bad-weather light distributions depending on an evaluation signal.

The pulsed light signal is emitted by the illuminating unit according to a light pattern, so that the weather condition detection may be simplified with the aid of the image capturing unit or evaluation unit.

The illuminating unit is controlled in such a way that a regular light pattern, in particular a checkerboard light pattern, is emitted. Due to the regular pattern, the deviation resulting from scattering of the image data detected by the image capture unit may be more easily identified. The certainty of the identification of a certain weather condition may be improved hereby with little complexity.

The light pattern can be emitted with a pulse duty factor of less than 50%. This means that the luminosity is relatively low, and no light function is thus generated.

The image capturing unit can be operated at a capture frequency adapted to the pulse frequency of the illuminating unit. The capture frequency preferably coincides with the pulse frequency, so that the image capturing unit is synchronized with the illuminating unit.

The illuminating unit can include a light source unit, which includes a plurality of light sources arranged in a matrix-like manner. The light sources arranged in a matrix-like manner area each controllable individually, so that the illuminating unit is designed as a headlamp. This makes it advantageously possible to easily generate predefined light patterns for identifying a weather condition.

The illuminating unit may include an optical unit, which is designed as an LCD device or as a micromirror device. A certain predefined light pattern which is desirable for the weather condition may also be advantageously generated hereby.

The apparatus can be activated when the vehicle is placed into operation. Once the traction drive has been activated, the apparatus according to the invention is also activated, so that the weather condition in the surroundings of the vehicle may be identified continuously while the vehicle is being driven or is at a standstill. The apparatus according to the invention may be arranged in a front, rear, or side area of the vehicle for capturing the surroundings.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
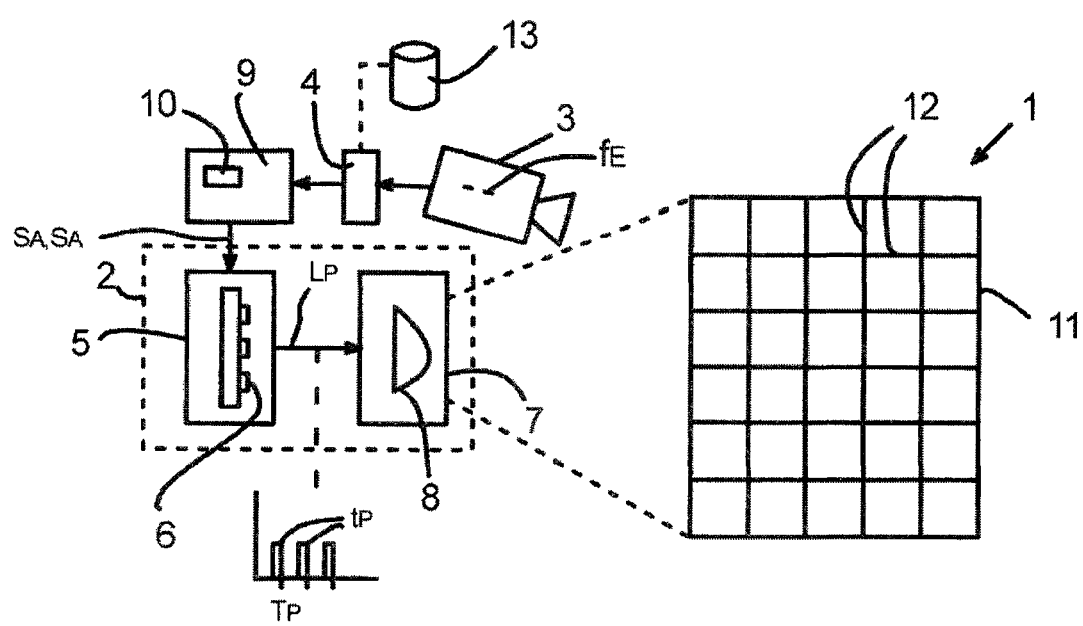
FIG. 1 shows a schematic representation of an apparatus according to the invention.
Figure 2:
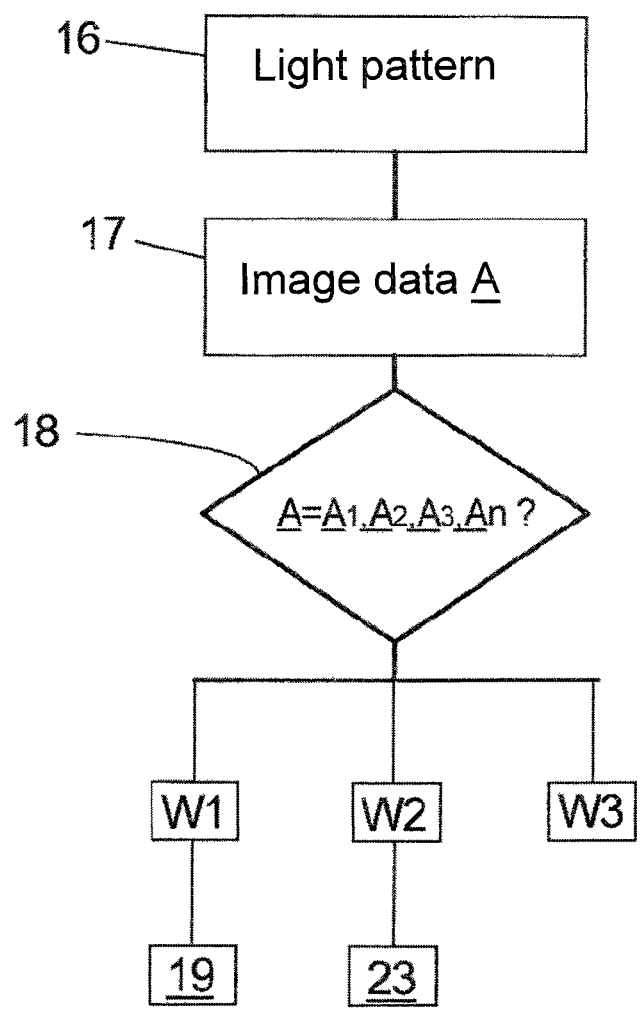
FIG. 2 shows a flow chart of the weather condition detection according to the invention.

An apparatus according to the invention for detecting a weather condition in surroundings, in particular in a front area 1, of a vehicle, essentially includes an illuminating unit 2 for illuminating front area 1, an image capturing unit 3 for capturing image information of the front area 1, as well as an evaluation unit 4 for evaluating the image information.

In the present exemplary embodiment, illuminating unit 2 includes a light source unit 5 having a plurality of illuminating elements 6. Illuminating elements 6 are arranged in a matrix-like manner in a matrix field having a number of rows and a number of columns. Illuminating elements 6 may each be designed as LED illuminating elements. An optical unit 7, which includes a lens device 8, is arranged in front of light source unit 5 in the main emission direction. The light emitted by illuminating elements 6 is projected with the aid of optical unit 7 onto vehicle front area 1 as a light function for the purpose of generating a predefined light distribution, for example a low-beam light distribution.

A control unit 9 is assigned to illuminating unit 2 or, in the present exemplary embodiment to light source unit 5, which generates a control signal $S_A$, with the aid of which individually controllable illuminating elements 6 are switched on or off and/or are dimmed to generate the predefined light distribution.

To identify the weather condition, control unit 9 includes a pulse modulation device 10, which, in a state of the vehicle in which no light distribution is generated, but in which the vehicle is only switched on or ready to be driven, a control signal $S_A'$ is generated, with the aid of which the number of illuminating elements 6 of light source unit 5 may be controlled or switched on and off. Control signal $S_A'$ is pulse duration-modulated at a predefined pulse frequency $f_P$, so that illuminating elements 6 are periodically switched on and off at pulse frequency $f_P$. Pulse frequency $f_P$ is greater than 100 Hz. It may be within a range between 100 kHz and 10 MHz. Pulse frequency $f_P$ is high enough that light signals $L_P$ emitted by illuminating elements 6 correspond to pulse frequency $f_P$ and are not perceptible to a human eye. Pulsed light signal $L_P$ is deflected or refracted by optical unit 7, so that a light pattern 11 occurs in vehicle front area 1. For this purpose, illuminating elements 6 are controlled in such a way that this light pattern 11 occurs. In the present exemplary embodiment, light pattern 11 is designed as a regular light pattern, namely as a checkerboard light pattern 11, which comprises a plurality of crossed light lines 12 on a measuring screen. This checkerboard light pattern 11 is projected onto a roadway in vehicle front area 1 with the aid of optical unit 7. Light pulses $L_P$ each have a pulse duration $t_P$. Pulse duty factor $t_G$ (quotient of pulse duration $t_P$ and periodic time T) is less than 50% in the present exemplary embodiment.

Light pattern 11 preferably has features relevant to the weather condition, which are identified by image capturing unit 3 and may be evaluated by evaluation unit 4. It is also possible that the light pattern has multiple different features relevant to the weather condition. A light distribution visible to the human eye may result from a superimposition of the features of the light patterns relevant to the weather condition.

To capture the image information in vehicle front area 1, image capturing unit 3 is operated at a capture frequency $f_E$, which corresponds to pulse frequency $f_P$ of illuminating unit 2, i.e., image capturing unit 3 is operated synchronously with illuminating unit 2.

Evaluation unit 4 includes a database 13, in which reference image data of light patterns assigned to different weather conditions are stored. The reference image data are stored as matrices $A_1, A_2, A_3 \ldots A_n$, which contain corresponding luminosity values in relation to front area 1 of the vehicle, which is made up of a space 14 and a roadway 15. The identification of different weather conditions is described below by way of example.

The apparatus according to the invention is activated as soon as the vehicle has been placed into operation, for example, the ignition of the vehicle has been turned on. With the aid of illuminating unit 2, light pulses $L_P$ are emitted periodically and continuously, i.e., without interruption until the light function is turned on, at pulse frequency $f_P$ in the direction of vehicle front area 1. Image capturing unit 3, which may be designed, for example, as a CCD camera, captures the instantaneous image data and combines them into an image data matrix A. The elements of matrix A are compared with elements of reference image data (reference image data matrices $A_1, A_2, A_3 \ldots A_n$) stored in database 13. Depending on the comparison, a weather condition signal is generated, which characterizes the instantaneous weather condition, from which the control unit may possibly generate an activation signal for controlling a predefined light distribution.

Figure 3:
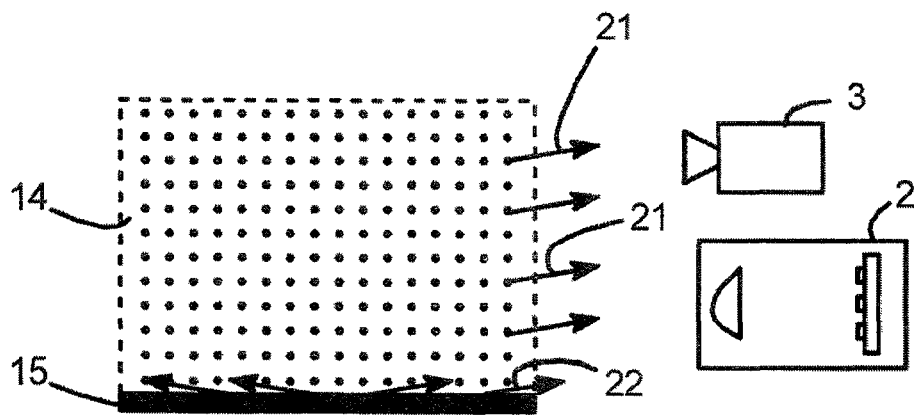
FIG. 3 shows a schematic side view of an area in front of the vehicle in the fog.

The light pattern is generated in the first step 16. In a second step 17, image data A are captured by image capturing unit 3 and forwarded to evaluation unit 4. In a comparison step 18, a comparison of instantaneous image data matrix A with reference image data matrices $A_1, A_2, A_3 \ldots A_n$ stored in database 13 takes place in evaluation unit 4, which may be designed, for example, as a microcontroller. If a match is established between matrix A and reference image data matrices $A_1$, which characterize weather condition W1 "fog," an activation signal corresponding to a weather condition signal is generated, which is transmitted to control unit 9. Control unit 9 then generates a control signal $S_A$, with the aid of which a fog light function 19 is generated. Weather condition W1 "fog" is detected if the ascertained light intensity values of vehicle front area 1 correspond to predefined reference image data A1 with the exception of a tolerance difference, depending on the location and intensity. As is apparent from FIG. 3, the matrix of instantaneous image data A is made up of light reflections 21 generated by fog droplets as well as light reflections 22 generated by roadway 15.

Figure 4:
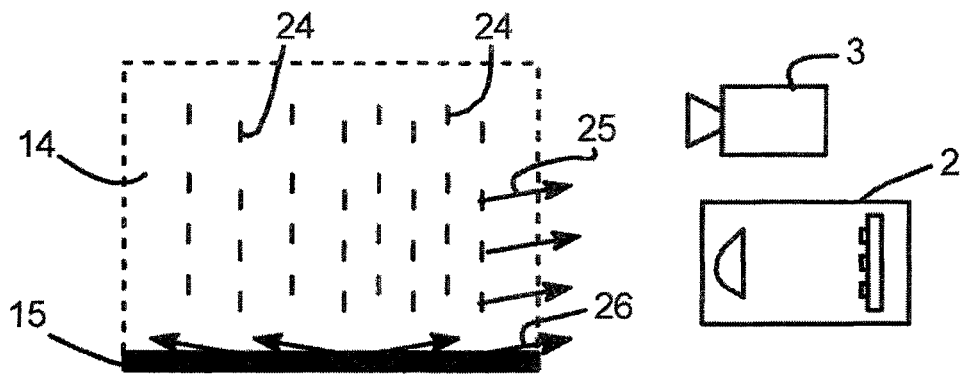
FIG. 4 shows a schematic side view of an area in front of the vehicle in the rain.
Figure 5:
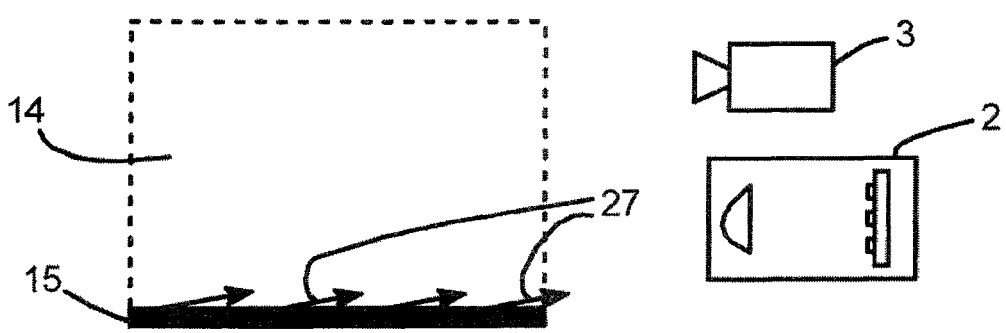
FIG. 5 shows a schematic side view of the dry area in front of the vehicle.

If it is determined in evaluation unit 4 that instantaneous image data A correspond to reference image data A2, which represent weather condition W2 "rain," an activation signal is generated, with the aid of which control unit 9 is signaled that it is to generate a control signal $S_A$ for light source unit 5, with the aid of which a bad weather light function 23 is generated. It is apparent from FIG. 4 that matrix A reproduces light reflections 25 generated by raindrops 24 and light reflections 26 generated by roadway 15. In the interest of simplicity, no further weather conditions are represented, which could impair the driving of vehicle 1. Reference image data A3, which represent here the weather condition of "dry roadway," are illustrated by way of example. In this case, only light reflections 27 of roadway 15 are captured by image capturing unit 3. No light reflections occur in the space situated thereabove, so that a correspondence with stored reference image data A3 occurs, due to relatively strong light reflections 27. If no or no additional light distribution is provided for this weather condition W3 "dry," no control signal $S_A$ is sent to control unit 9.

If a light function is activated depending on the capture of a weather condition, for example in the case of weather conditions "fog" and "rain," this is taken into account during the evaluation. Prior to the comparison of the instantaneous image data with the reference image data, the light data manipulated by the instantaneous light function are removed from the instantaneous image data, or a difference is formed, so that the resulting instantaneous image data are then compared with the reference image data. Database 13 of evaluation unit 4 thus includes additional light function image data, so that, depending on the instantaneous light function, the corresponding light image data are subtracted from the instantaneous image data. The weather condition identification may thus continue to be operated while operating the illuminating function for generating a light function.

It should be noted that, in an alternative specific embodiment of the invention, the light source unit may be formed by a laser light source. The optical unit includes, for example, an LCD device or a micromirror device (DMD). In this specific embodiment, the optical unit and not the light source unit is controlled by the control unit at the pulse frequency in such a way that the pulsed light signal is generated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for identifying a weather condition in surroundings of a vehicle, the apparatus comprising:
   an illuminating unit to illuminate the surroundings;
   a control unit to control the illuminating unit;
   an image capturing unit to capturing image information of the surroundings; and
   an evaluation unit to evaluate the image information, wherein image data provided by the image capturing unit is compared with predefined reference image data, each characterizing different weather conditions, and a weather condition signal being generated depending on a match of the comparison, the weather condition signal being indicative of an instantaneous weather condition in the surroundings of the vehicle,
   wherein the control unit includes a pulse modulation device to control the illuminating unit to emit pulsed light signals, and
   wherein the pulsed light signals are emitted at a pulse frequency and a luminosity such that a light distribution of the pulsed light signals is imperceptible to the human eye.

2. The apparatus according to claim 1, wherein the pulse modulation device generates a control signal that causes the illuminating device to emit pulsed light signals according to a light pattern.

3. The apparatus according to claim 2, wherein the light pattern is a light pattern defined on a measuring screen or a checkerboard light pattern, which has features relevant to the weather condition.

4. The apparatus according to claim 2, wherein the light pattern is emitted as a light pattern having a pulse duty factor of less than 50%.

5. The apparatus according to claim 1, wherein, depending on the weather condition signal, an activation signal is generated for controlling the illuminating unit to generate a light distribution adapted to the instantaneous weather condition.

6. The apparatus according to claim 1, wherein the image capturing unit is operated at a capture frequency that corresponds to a pulse frequency of the illuminating device.

7. The apparatus according to claim 1, wherein the illuminating unit includes a light source unit and an optical unit for generating a predefined light distribution.

8. The apparatus according to claim 7, wherein the light source unit includes at least two light sources arranged in a matrix-like manner or a laser light source.

9. The apparatus according to claim 7, wherein the optical unit is a lens device or an LCD device or a microlens device or a micromirror device or a microshutter device.

10. The apparatus according to claim 1, wherein the apparatus is activated when the vehicle is started up.

11. The apparatus according to claim 2, wherein more than one light pattern is generated, offset in time.

* * * * *